United States Patent [19]

Okuma et al.

[11] Patent Number: 4,832,176

[45] Date of Patent: May 23, 1989

[54] SYSTEM FOR AUTOMATICALLY DISTRIBUTING AND SUPPLYING PARTS

[75] Inventors: Kuniaki Okuma; Ikuo Maezawa; Hideharu Koizumi; Masato Tanaka; Hironobu Kida, all of Sayama, Japan

[73] Assignee: Honda Giken Kogyo Kabushiki Kaisha, Tokyo, Japan

[21] Appl. No.: 94,387

[22] Filed: Sep. 8, 1987

[30] Foreign Application Priority Data

Sep. 8, 1986 [JP] Japan .............................. 61-214797
Sep. 8, 1986 [JP] Japan .............................. 61-214798
Sep. 8, 1986 [JP] Japan ........................ 61-139731[U]
Sep. 27, 1986 [JP] Japan ........................ 61-148281[U]

[51] Int. Cl.$^4$ .......................................... B65G 47/26
[52] U.S. Cl. ................................. 198/418.1; 198/427; 198/436; 198/468.6; 221/68; 414/224; 901/7
[58] Field of Search ............... 29/809; 198/420, 427, 198/436, 468.6; 221/68; 414/224, 225; 901/6, 7

[56] References Cited

U.S. PATENT DOCUMENTS

| | | | |
|---|---|---|---|
| 3,095,999 | 7/1963 | Peterson | 221/68 X |
| 3,889,343 | 6/1975 | Miller et al. | 29/809 |
| 3,977,160 | 8/1976 | Klug et al. | 221/68 X |
| 4,130,936 | 12/1978 | Cottrell | 29/809 |
| 4,587,703 | 5/1986 | Azizi et al. | 414/225 X |
| 4,688,978 | 8/1987 | Ohkuma et al. | 414/224 |

FOREIGN PATENT DOCUMENTS

115518 9/1980 Japan .............................. 414/224

Primary Examiner—Howard N. Goldberg
Assistant Examiner—Andrew E. Rawlins
Attorney, Agent, or Firm—Birch, Stewart, Kolasch & Birch

[57] ABSTRACT

A system for automatically distributing and supplying parts includes a parts distributing device for delivering an array of parts, and a parts supplying device for feeding the parts to a parts installing device at spaced intervals corresponding to parts installing positions. The parts supplying device has a first positioning member for receiving the delivered array of parts, a second positioning member connected to the first positioning member through flexible tubular members for spacing the parts at the spaced intervals, and a parts feed mechanism movable selectively into confronting relation to the second positioning member and the parts installing device for receiving the parts from the second positioning member and feeding the parts to the parts installing device.

22 Claims, 8 Drawing Sheets

SYSTEM FOR AUTOMATICALLY DISTRIBUTING AND SUPPLYING PARTS

BACKGROUND OF THE INVENTION

The present invention relates to a system for automatically distributing and supplying parts, and more particularly to an automatic parts distributing and supplying system of high versatility for accurately and reliably feeding a predetermined number of valve guides, for example, at desired spaced intervals to an apparatus for pressing the valve guides into a cylinder head for an internal combustion engine, the system being capable of easily varying the number of valve guides to be supplied and the spaced intervals thereof, so that valve guides can be supplied for installation on cylinder heads of various different types.

Internal combustion engines are assembled within a short period of time and highly efficiently in an automated line production process. When installing valve guides on a cylinder head for the purpose of mounting inlet valves and outlet valves on the cylinder head, for example, valves guides delivered from a parts feeder or the like are automatically supplied in a certain quantity at spaced intervals by means of an automatic supply apparatus to a valve guide installing apparatus by which the valve guides are pressed into the cylinder head.

At present, there are available various types of engines, i.e., two-cylinder, three-cylinder, four-cylinder, six-cylinder engines, and engines with two valves per cylinder and four valves per cylinder, for example.

The conventional automatic supply apparatus is designed to supply a fixed number of valve guides at fixed spaced intervals for each of engines of one type, because for a different engine type, a different number of valve guides to be installed must be pressed into a cylinder head at a different angle and in different positions. Therefore, where many different engine types are to be assembled, as many different automatic supply apparatus as the number of such different engine types must be employed. This would however be economically infeasible, and require a considerable space for the automatic supply apparatus to occupy in a working area, making it difficult to utilize the working area effectively. Such an arrangement would not lend itself to a presently employed system for manufacturing many engine types each in a small quantity.

The valve guide installing apparatus should be supplied with a desired number of valve guides that have been positionally adjusted to meet their angle and positions required when pressing the valve guides into a cylinder head. Generally, therefore, as many delivery passages as desired are provided between a parts feeder and the valve guide installing apparatus so that valve guides will be supplied through the delivery passages to the valve guide installing apparatus.

With the above conventional design, however, the delivery passages cannot be of a bent shape where the parts to be delivered are shaped like rods, such as valve guides. Consequently, the delivery passages have to be considerably long in a horizontal direction between the parts feeder and the valve guide installing apparatus. A considerable period of time is thus required for sending valve guides from the parts feeder to the valve guide installing apparatus, with the result that it is difficult to press the valve guides into the cylinder head efficiently. Since valve guides are delivered horizontally down the delivery passages, they cannot smoothly be fed in and along the delivery passages, and may not be reliably supplied to the valve guide installing apparatus.

SUMMARY OF THE INVENTION

It is a general object of the present invention to provide an automatic parts distributing and supplying system having a parts distributing device for arraying parts delivered through a parts feeder at prescribed spaced intervals, and a parts supplying apparatus for feeding the parts from the parts distributing device to a parts installing device at spaced intervals corresponding to positions where the parts are to be installed on a desired workpiece, so that desired parts can automatically and easily be installed on workpieces of different types, the system is highly versatile, and is a space saver.

Another object of the present invention is to provide a system for automatically distributing and supplying parts, comprising a parts distributing device for delivering an array of parts, and a parts supplying device for feeding the parts to a parts installing device at spaced intervals corresponding to parts installing positions, said parts supplying device including a first positioning member for receiving the delivered array of parts, a second positioning member connected to said first positioning member through flexible tubular members for spacing the parts at said spaced intervals, and a parts feed mechanism movable selectively into confronting relation to said second positioning member and said parts installing device for receiving the parts from said second positioning member and feeding the parts to said parts installing device.

Still another object of the present invention is to provide an automatic parts distributing and supplying system wherein said parts feed mechanism has a holder for positioning and holding the parts at said spaced intervals corresponding to the parts installing positions, said holder being displaceable from a parts receiving position in which said holder receives the parts from said parts distributing device and holds the parts therein to a parts discharging position in which said holder discharges the parts to said parts installing device.

Yet another object of the present invention is to provide an automatic parts distributing and supplying system wherein said parts supplying device further includes a base displaceable with respect to a foundation base, said first and second positioning members being fixed to said base at different heights, and a movable body mounted on said base and movable toward and away from said parts installing device by an actuator, said parts feed mechanism having an angularly movable arm mounted on said movable body, said holder being mounted on said arm, the arrangement being such that said movable body is displaced by said actuator toward said parts installing device for allowing said holder to supply the parts to said parts installing device after the parts delivered from said parts distributing device to said first positioning member have been delivered through said flexible tubular members to said second positioning member, said parts are positioned and held in said holder and said holder is brought into confronting relation to said parts installing device in said parts discharging position.

Still yet another object of the present invention is to provide an automatic parts distributing and supplying system wherein said parts feed mechanism comprises first and second rotatable shafts supporting respective gears fixed thereto and meshing with each other, rotating means coupled to one of said first and second rotatable shafts for rotating the first and second rotatable shafts through said gears, first and second holders for positioning and holding parts therein, and first and second arms supporting said first and second holders thereon and mounted on said first and second rotatable shafts, respectively, the arrangement being such that after the parts have been held in said first and second holders, said first and second arms are turned by said rotating means to bring said first and second holders into confronting relation to said parts installing device.

A further object of the present invention is to provide an automatic parts distributing and supplying system wherein said holder includes first and second holders, said parts feed mechanism comprising first and second rotatable shafts supporting respective gears fixed thereto and meshing with each other, rotating means coupled to one of said first and second rotatable shafts for rotating the first and second rotatable shafts through said gears, and first and second arms supporting said first and second holders thereon and mounted on said first and second rotatable shafts, respectively, the arrangement being such that after the parts have been held in said first and second holders, said first and second arms are turned by said rotating means from said parts receiving position to said parts discharging position to bring said first and second holders into confronting relation to said parts installing device.

A yet further object of the present invention is to provide an automatic parts distributing and supplying system wherein said holder includes first and second holders, said parts feed mechanism comprising first and second rotatable shafts supporting respective gears fixed thereto and meshing with each other, rotating means coupled to one of said first and second rotatable shafts for rotating the first and second rotatable shafts through said gears, and first and second arms supporting said first and second holders thereon and mounted on said first and second rotatable shafts, respectively, the arrangement being such that after the parts have been held in said first and second holders, said first and second arms are turned by said rotating means from said parts receiving position to said parts discharging position to bring said first and second holders into confronting relation to said parts installing device.

A still further object of the present invention is to provide an automatic parts distributing and supplying system wherein said rotating means comprises a rack-and-pinion mechanism including an actuator, said actuator comprising a cylinder having a piston rod, said rack-and-pinion mechanism having a rack connected to said piston rod and a pinion mounted on one of said first and second rotatable shafts and held in mesh with said rack, whereby when said cylinder is actuated, said first and second rotatable shafts can be rotated in unison through said rack and said pinion.

A yet still further object of the present invention is to provide an automatic parts distributing and supplying system wherein said rotating means comprises a rack-and-pinion mechanism including an actuator, said actuator comprising a cylinder having a piston rod, said rack-and-pinion mechanism having a rack connected to said piston rod and a pinion mounted on one of said first and second rotatable shafts and held in mesh with said rack, whereby when said cylinder is actuated, said first and second rotatable shafts can be rotated in unison through said rack and said pinion.

Still another object of the present invention is to provide an automatic parts distributing and supplying system wherein said rotating means comprises a rack-and-pinion mechanism including an actuator, said actuator comprising a cylinder having a piston rod, said rack-and-pinion mechanism having a rack connected to said piston rod and a pinion mounted on one of said first and second rotatable shafts and held in mesh with said rack, whereby when said cylinder is actuated, said first and second rotatable shafts can be rotated in unison through said rack and said pinion.

Yet still another object of the present invention is to provide an automatic parts distributing and supplying system wherein said parts feed mechanism includes lock means for securely holding the parts in said holder, said lock means being released to receive and discharge the parts when said holder reaches each of said parts receiving position and said parts discharging position, and being actuated to lock the parts in said holder while the holder is being moved between said parts receiving position and said parts discharging position.

A further object of the present invention is to provide an automatic parts distributing and supplying system wherein said holder has a plurality of first holes defined therein for receiving the parts therein, a plurality of second holes defined therein substantially perpendicularly to said first holes, a plurality of lock pins disposed in said second holes, respectively, and associated with resilient members, respectively, a fixed cam member, and a locking cam member slidably mounted on said holder and extending perpendicularly to said lock pins, said cam member having cam faces for engaging said lock pins and grooves for receiving said lock pins, the arrangement being such that when said holder reaches each of said parts receiving position and said parts discharging position, said locking cam member is engaged by said fixed cam member to cause said cam faces to push said lock pins into said second holes to release the parts, and when said holder is displaced between said parts receiving position and said parts discharging position, said lock pins are moved by said resilient members into said grooves of said cam member to lock the parts in said holder.

A yet further object of the present invention is to provide an automatic parts distributing and supplying system wherein each of said lock pins has a circumferential groove defined in an outer circumferential surface thereof, the arrangement being such that when said lock pins are pushed by said cam faces of said locking cam member, the parts are loosely fitted in said circumferential grooves of the lock pins to allow the parts to be released from said holder, and when said lock pins are positioned in said grooves of the locking cam member, surfaces defining said circumferential grooves of said lock pins push said parts under the resiliency of said resilient members to lockingly hold said parts in said holder.

A still further object of the present invention is to provide an automatic parts distributing and supplying system wherein said first holes of said holder have a depth selected to cause the parts received therein to be partly exposed out of said holder.

A yet still further object of the present invention is to provide an automatic parts distributing and supplying system wherein said parts feed mechanism further includes a rotatable member mounted on said locking cam member, said rotatable member being rotatable on said fixed cam member.

A yet still further object of the present invention is to provide an automatic parts distributing and supplying system wherein said holder and said second positioning member are spaced from each other by a gap smaller than the length of said parts in the direction in which they are delivered.

Still another object of the present invention is to provide an automatic parts distributing and supplying system wherein said second positioning member is detachably mounted on said base.

Yet still another object of the present invention is to provide an automatic parts distributing and supplying system wherein said holder is detachably mounted on said arm.

A further object of the present invention is to provide an automatic parts distributing and supplying system wherein said parts distributing device comprises a main body inclined in a first direction with respect to a vertical direction and having a plurality of parts delivery passages, a distributing plate mounted on an upper surface of said main body and a plurality of parts insertion openings defined therein in alignment with said parts delivery passages, respectively, and disposed at respective heights dependent on the parts, and a distributor for aligning parts on said distributing plate at one end thereof in said first direction, said distributor being movable by an actuator to move the parts in a second direction normal to said first direction, the arrangement being such that after the parts delivered from a parts feeder have been aligned by said distributor, said distributor is moved by said actuator in said second direction to allow said parts to drop through said parts insertion openings into said parts delivery passages, respectively.

A still further object of the present invention is to provide an automatic parts distributing and supplying system wherein said distributor has a parts fitting groove for aligning the parts therein on said distributing plate, and includes a stopper, the arrangement being such that when said distributor is moved by said actuator, a set of parts to be distributed in a next cycle which are held against the uppermost one of the parts in said parts fitting groove are retained by said stopper against movement into said distributor.

A yet further object of the present invention is to provide an automatic parts distributing and supplying system wherein said distributor has a parts fitting groove for aligning the parts therein on said distributing plate, and supports an engaging member positionally adjustably mounted on said distributor and entering said parts fitting groove to keep the parts in said parts fitting groove.

A yet still further object of the present invention is to provide an automatic parts distributing and supplying system wherein said distributing plate is detachably mounted on said main body.

A still further object of the present invention is to provide an automatic parts distributing and supplying system wherein said main body has an upper portion connected to said parts feeder positioned above said main body through a flexible tubular member, further including a plurality of flexible tubular members connected to said parts delivery passages, respectively, of said main body and directed downwardly in registry with parts insertion holes defined in said first positioning member of said parts supplying device.

A yet further object of the present invention is to provide an automatic parts distributing and supplying system wherein said parts are valve guides.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
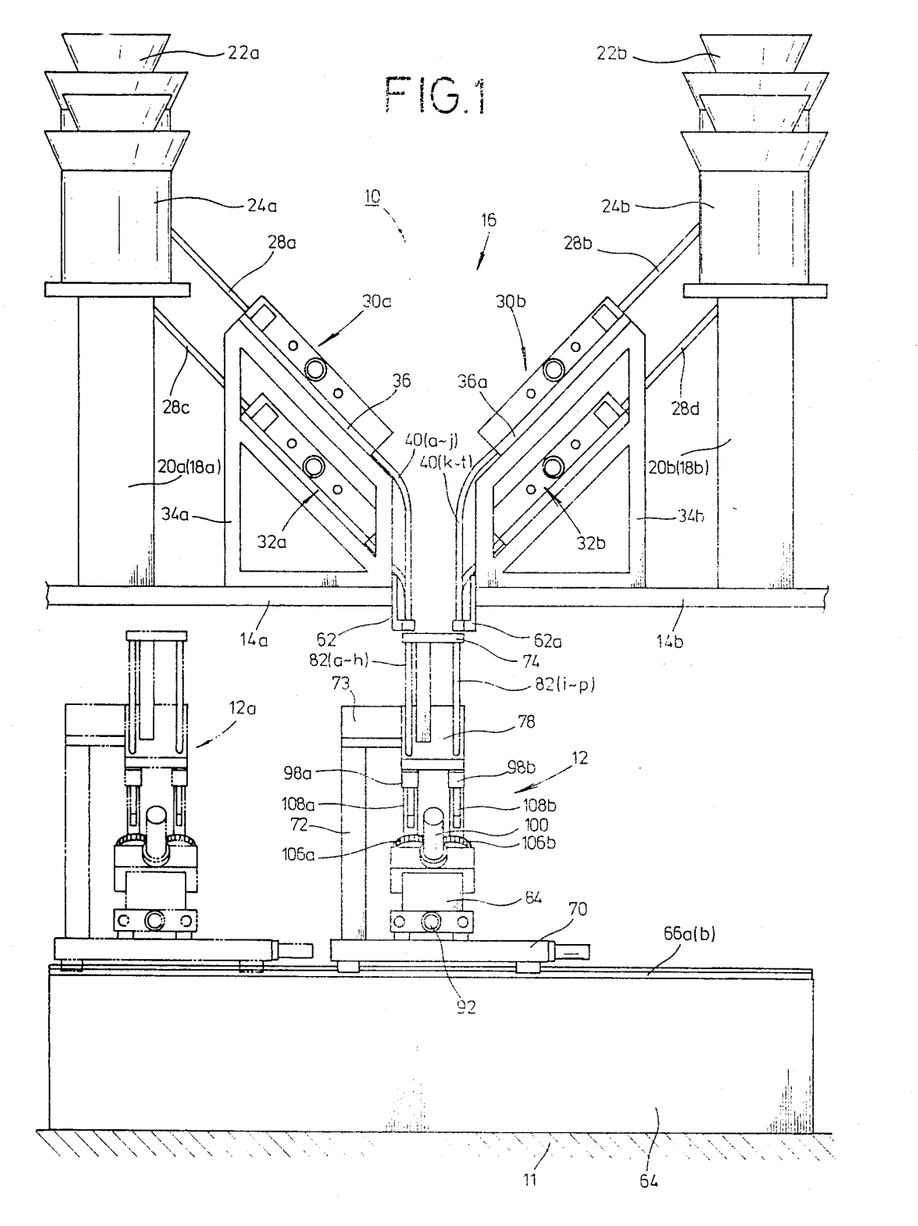
FIG. 1 is a front elevational view, partly omitted from illustration, of an automatic parts distributing and supplying system according to the present invention.

FIG. 1 shows an automatic parts distributing and supplying system generally designated by the reference numeral 10. The automatic parts distributing and supplying system 10 is essentially composed of a parts supplying device 12 mounted on a floor 11 and a parts distributing device 16 mounted on upper walls 14a, 14b disposed horizontally above the floor 11, the parts distributing device 16 being capable of feeding a prescribed number of arrayed parts such as valve guides at equally spaced intervals to the parts supplying device 12.

Figure 2:
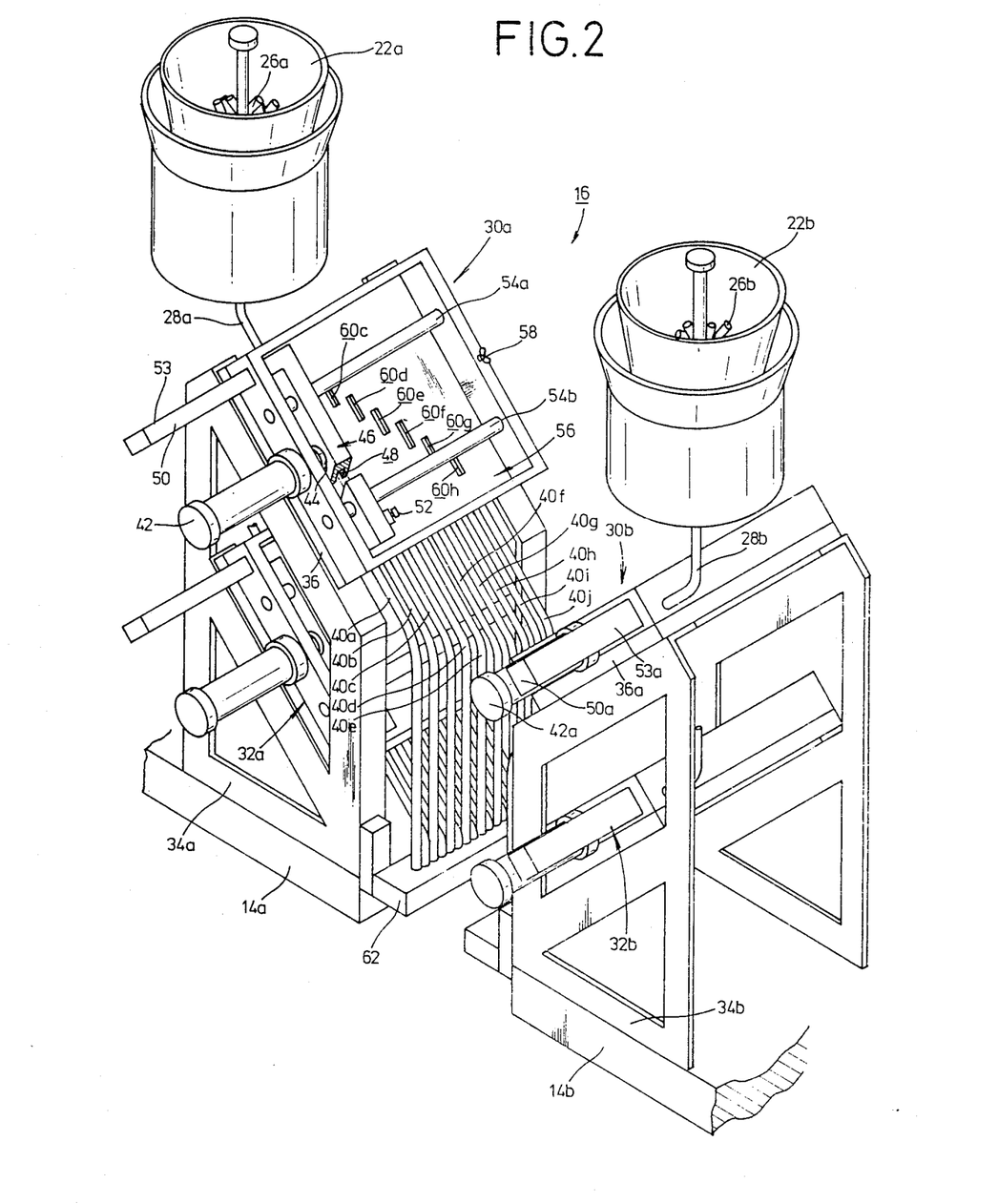
FIG. 2 is a perspective view of a parts distributing device of the automatic parts distributing and supplying system.

The parts distributing device 16 will first be described. The upper walls 14a, 14b support thereon vertical support posts 18a, 20a and 18b, 20b of different heights. Parts feeders 22a, 22b are mounted on the higher support posts 18a, 18b, respectively, whereas parts feeders 24a, 24b are mounted on the lower support posts 20a, 20b, respectively. As shown in FIG. 2, the parts feeders 22a, 22b are supplied with valve guides 26a for outlet valves and valve guides 26b for inlet valves, respectively, the valve guides 26a, 26b being adapted to be pressed into a single cylinder head (not shown). Likewise, the parts feeders 24a, 24b are supplied with valve guides (not shown) for outlet valves and valve guides (not shown) for inlet valves, respectively, these valve guides being adapted to be pressed into another cylinder head (not shown). To the parts feeders 22a, 22b and 24a, 24b, there are connected ends of flexible tubular members 28a, 28b and 28c, 28d, respectively, each similar in shape to a coil spring. The other ends of the flexible tubular members 28a, 28b and 28c, 28d are joined to arraying mechanisms 30a, 30b and 32a, 32b, respectively.

The upper walls 14a, 14b also support mount bases 34a, 34b with the arraying mechanisms 30a, 30b mounted obliquely on the upper ends of the mount bases 34a, 34b, respectively. The other arraying mechanisms 32a, 32b are also mounted obliquely on the mount bases 34a, 34b below the arraying mechanisms 30a, 30b, respectively.

Figure 3:
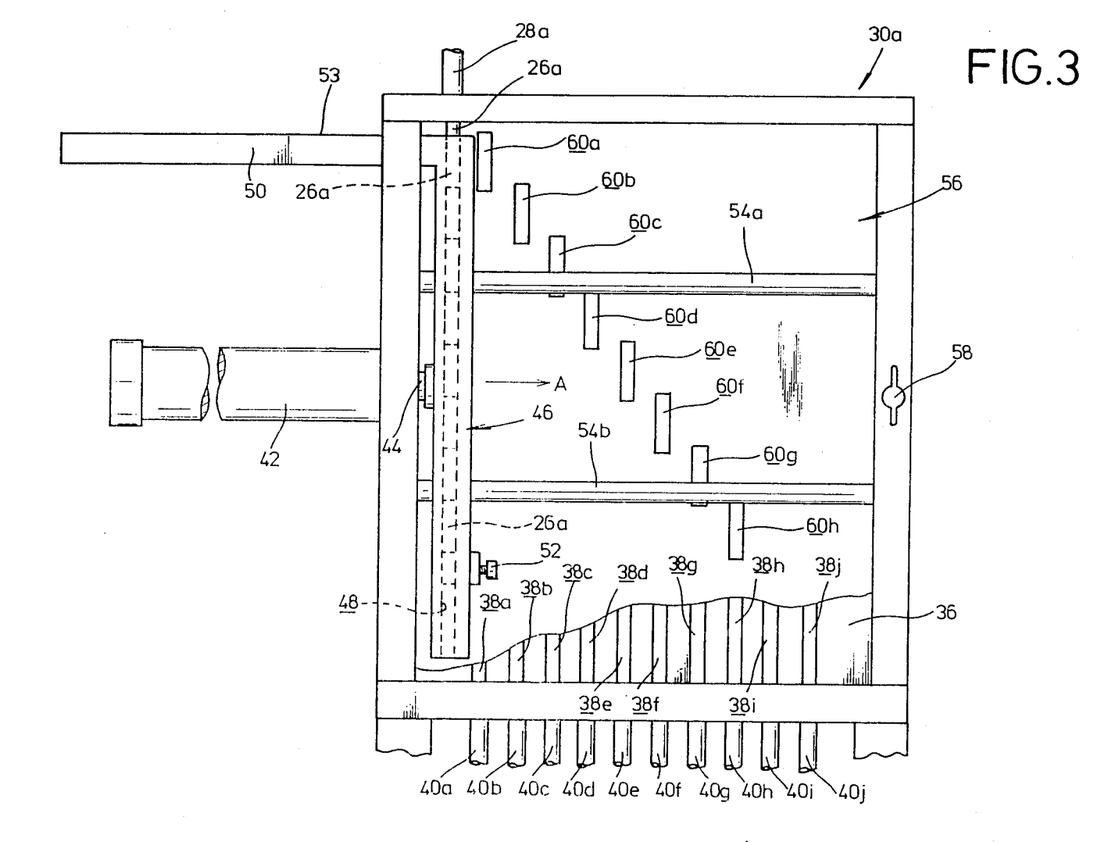
FIG. 3 is plan view, partly broken away, of an arraying mechanism of the parts distributing device shown in FIG. 2.

As illustrated in FIGS. 1 through 3, the arraying mechanism 30a has a plate 36 fixedly mounted on the mount base 34a and having parallel vertical slots 38a through 38j defined therein, the slots 38a through 38j having a width larger than the diameter of the valve guides 26a (see FIG. 3). Flexible tubular members 40a through 40j each similar in shape to a coil spring have ends joined to the plate 36 in communication with the lower ends of the slots 38a through 38j, respectively. The number of the slots 38a through 38j may be varied as desired.

A cylinder 42 is fixed endways to one side of the plate 36 perpendicularly to the slots 38a through 38j, the cylinder 42 having a piston rod 44 coupled to a distributor 46 extending in a direction normal to the piston rod 44. The distributor 46 has a parts fitting groove 48 defined in a lower surface thereof and extending parallel to the slots 38a through 38j of the plate 36. A stopper 50 projects transversely from the distributor 46 at its upper end and extends for a certain length on the side of the cylinder 42. When the distributor 46 is moved in the direction of the arrow A (FIG. 3) by the cylinder 42, the upper side surface 53 of the stopper 50 holds valve guides 26a in the tubular member 28a to prevent them from falling out of the tubular member 28a. An engaging member 52 is secured to the distributor 46 and has its inner end inserted into the parts fitting groove 48 at a prescribed position. Valve guides 26a fed from the flexible tubular member 28a which is coupled to an upper edge of the plate 36 are introduced into the parts fitting groove 48 of the distributor 46 until the lowermost valve guide 26a is engaged by the engaging member 52, whereupon a certain number, e.g., eight, of valve guides 26a are aligned in the groove 48. Thus, valve guides 26a for outlet valves and valve guides 26b for inlet valves can be delivered to a cylinder head (not shown) for a four-cylinder, four-valve engine through the arraying mechanisms 30a, 30b. Where valve guides 26a are to be delivered to a different cylinder head through the arraying mechanism 30a, the position of the engaging member 52 with respect to the distributor 46 should be selected to vary the number of valve guides 26a that can be accommodated in the parts fitting groove 48, and a distributing plate (described below) should be replaced with a desired one.

Two parallel guide bars 54a, 54b extend through the distributor 46. The distributor 46 is movable on and along the guide bars 54a, 54b in the direction normal to the slots 38a through 48j when the cylinder 42 is actuated.

A distributing plate 56 is detachably secured to the upper surface of the plate 36 by means of a screw 58. The distributing plate 56 has eight rectangular openings 60a through 60h each having a size capable of passing a valve guide 26a therethrough. The openings 60a through 60h are positioned in alignment with the slots 38a through 38h, respectively, and defined at the same heights as those of the respective valve guides 26a accommodated in the groove 48 of the distributor 46. That is, the openings 60a through 60h are progressively staggered downwardly in that order. With the distributor 46 in the position shown in FIGS. 2 and 3, the uppermost opening 60a is positioned most closely to the distributor 46 and the lowermost opening 60h is remotest from the distributor 46. The other or lower ends of the tubular members 40a through 40j are fitted in a support member 62 and directed downwardly.

The arraying mechanism 30b is identical in construction to the arraying mechanism 30a. Those components of the arraying mechanism 30b which are denoted by identical reference numerals with a suffix a and identical to those of the arraying mechanism 30a are will not be described in detail. To the plate 36a of the arraying mechanism 30b, there is connected ends of valve guide feeding tubular members 40k through 40t, the other ends of which are fixed to a support member 62a, as shown in FIG. 1.

The arraying mechanisms 32a, 32b for feeding valve guides (not shown) to a different cylinder head are of the same structure as that of the arraying mechanism 30a. Each of the arraying mechanisms 32a, 32b has a distributing plate having as many openings as the number of valve guides to be pressed into the cylinder head. The engaging member on the distributor should be positionally selected dependent on the number of valve guides required.

The parts supplying device 12 is disposed below the parts distributing device 16. As shown in FIG. 1, the parts supplying device 12 has a foundation base 64 placed on the floor 11. A pair of parallel rails 66a, 66b is mounted on the foundation base 64 and extends longitudinally of the foundation base 64. A base 70 is movably mounted on the rails 66a, 66b, the base 70 supporting a vertical support plate 72. The upper end of the support plate 72 is secured to an upper positioning plate 74 through an attachment plate 73. The upper positioning plate 74 lies parallel to the support members 62, 62a of the parts distributing device 16 and has holes 76a through 76j and 76k through 76t (FIG. 4) coaxial or registered with the tubular members 40a through 40j and 40k through 40t connected to the arraying mechanisms 30a, 30b.

Figure 5:
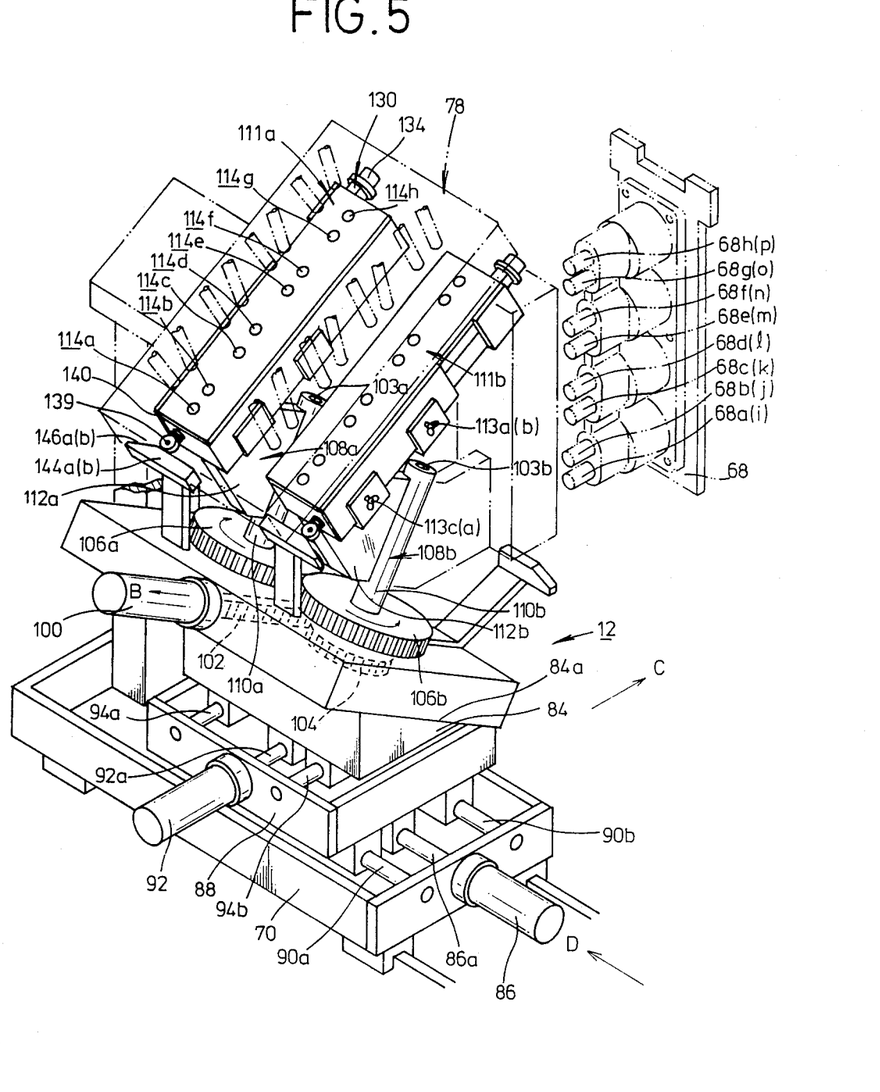
Figure 6:
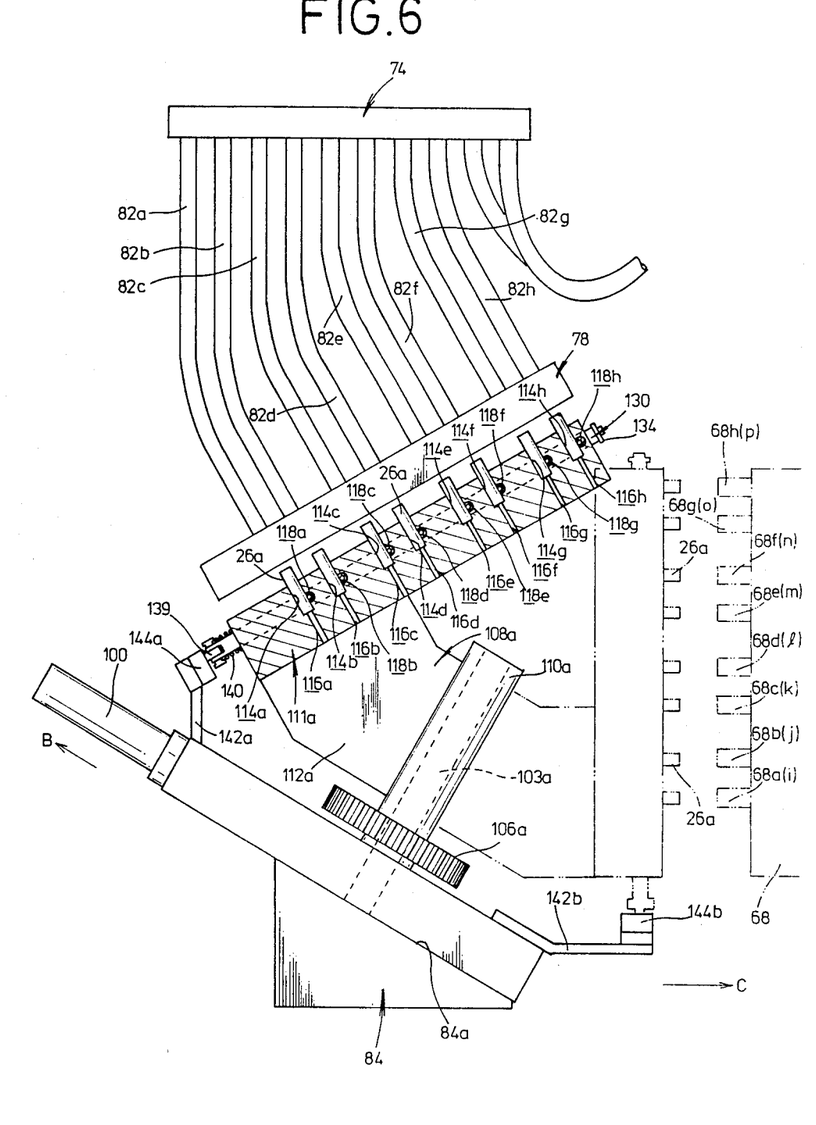
FIG. 6 is a side elevational view, partly in cross section, of a parts feed mechanism of the parts supplying device.

A lower positioning plate 78 is detachably mounted on the support plate 72, the lower positioning plate 78 being inclined with respect to the horizontal direction. The lower positioning plate 78 has holes 80a through 80h and 80i through 80p spaced at intervals equal to the spaced intervals between presser attachments 68a through 68h and 68i through 68p of a parts installing device 68 (FIGS. 5 and 6). The holes 76a through 76h of the upper positioning plate 74 and the holes 80a through 80h of the lower positioning plate 78 are held in communication with each other through respective flexible tubular members 82a through 82h. The other holes 76k through 76r of the upper positioning plate 74 and the holes 80i through 80p of the lower positioning plate 78 are held in communication with each other through respective flexible tubular members 82i through 82p.

Figure 4:
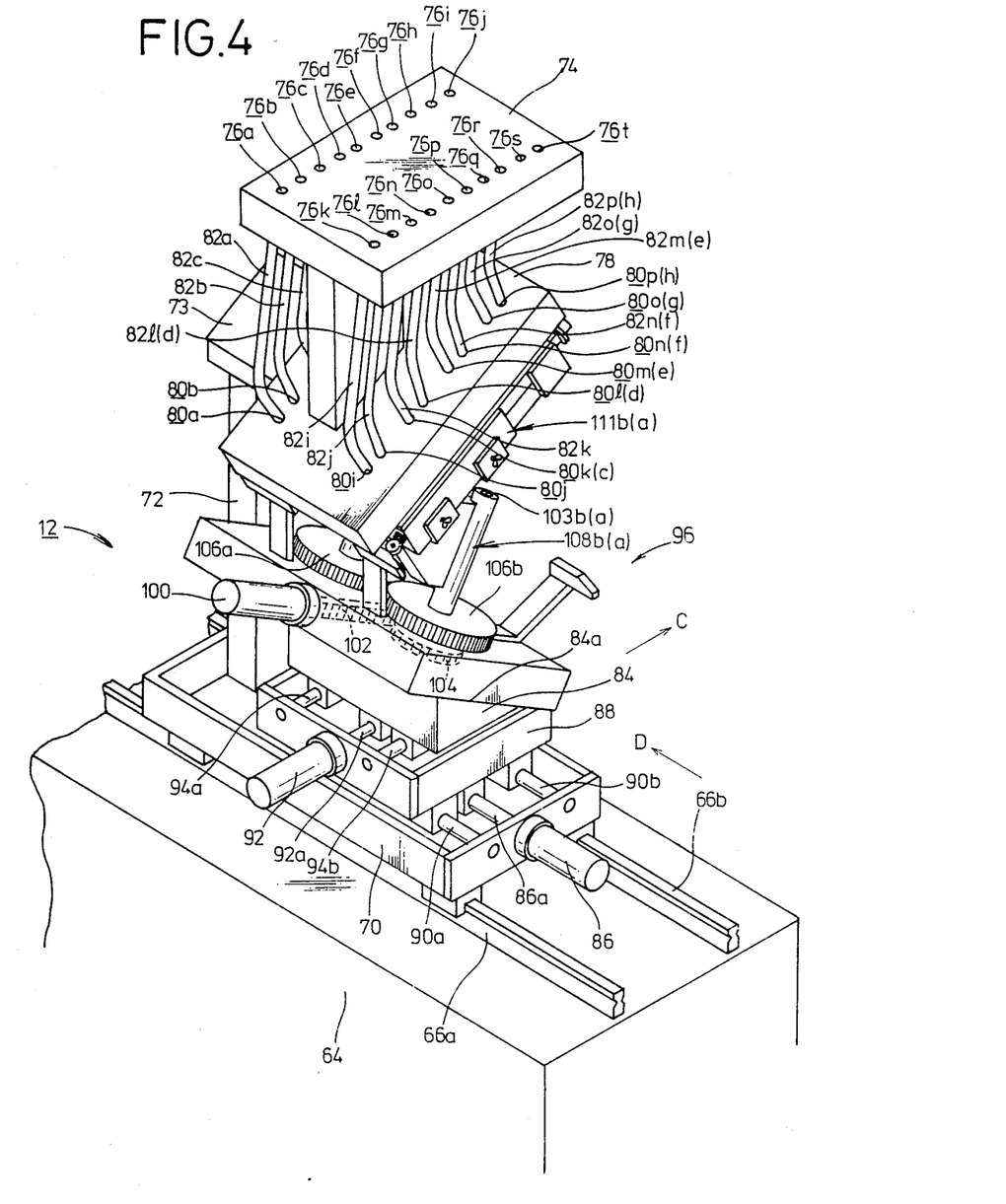
FIGS. 4 and 5 are fragmentary perspective views of a parts supplying device of the automatic parts distributing and supplying system.

A movable body 84 is movably mounted on the base 70 for movement in a longitudinal direction of the foundation base 64 and a direction normal to the longitudinal direction of the foundation base 64. As shown in FIGS. 4 and 5, a first cylinder 86 is secured to the base 70 and has a piston rod 86a coupled to a movable base 88. Two guide bars 90a, 90b are mounted in the foundation base 70 one on each side of the cylinder 86 for guiding the movable base 88. To the movable base 88, there is fixed a second cylinder 92 extending in a direction perpendicular to the first cylinder 86, with guide bars 94a, 94b mounted in the movable base 88 one on each side of the second cylinder 92. The second cylinder 92 has a piston rod 92a joined to the movable body 84 which is movable toward and away from the parts installing device 68 by the second cylinder 92 while being guided by the guide bars 94a, 94b.

A parts feed mechanism 96 is mounted on the movable body 84. The movable body 84 has an upper portion 84a inclined with respect to the horizontal direction, and a cylinder 100 is fixed to an upper end of the upper portion 84a. The cylinder 100 has a piston rod (not shown) to which a rack 102 is coupled. Two rotatable shafts 103a, 103b are rotatably supported on the upper portion 84a, the shaft 103b having a pinion 104 meshing with the rack 102. The shafts 103a, 103b support gears 106a, 106b, respectively, of relatively large diameter which are held in mesh with each other. Arms 108a, 108b are fitted respectively over the shafts 103a, 103b.

The arms 108a, 108b include cylindrical portions 110a, 110b fitted over the shafts 103a, 103b, respectively, and attachments 112a, 112b projecting laterally from the cylindrical portions 110a, 110b and having inclined end surfaces. Holders 111a, 111b each substantially in the form of a rectangular parallelepiped are detachably mounted on the inclined end surfaces of the attachments 112a, 112b, respectively, by means of screws 113a, 113b and 113c, 113d.

The holder 111a has holes 114a through 114h which will be coaxially registered with the holes 80a through 80h, respectively, for receiving valve guides 26a dropped from the holes 80a through 80h, when the holder 111a faces the lower positioning plate 78. The holder 111a is spaced from the lower positioning plate 78 by a gap smaller than the length of the valve guides 26a in the direction in which the valve guides 26a are delivered from the holder 111a to the lower positioning plate 78. The holes 114a through 114h have an axial length smaller than the length of the valve guides 26a, and have inner ends held in communication with smaller-diameter holes 116a through 116h (FIG. 6) defined in the holder 111a. The holder 111a also has holes 118a through 118h defined perpendicularly to the respective holes 114a through 114h in communication therewith. Lock pins 120a through 120h (FIGS. 7(a) and 7(b)) are fitted respectively in the holes 118a through 118h.

The lock pins 120a through 120h include smaller-diameter portions 122a through 122h, respectively, and also have circumferential grooves 124a through 124h defined in their outer circumferential surfaces. Coil springs 126a through 126h are disposed around the smaller-diameter portions 122a through 122h. A plate 128 is secured to one side of the holder 111a in closing relation to one ends of the holes 118a through 118h. Therefore, the lock pins 126a through 126h are normally urged by the coil springs 126a through 126h to project out of the other ends of the holes 118a through 118h. A rod-shaped cam member 130 is slidably mounted on the holder 111a in engagement with the projecting ends of the lock pins 120a through 120h.

The cam member 130 is inserted in fitting portions 132a, 132b on opposite ends of the holder 111a, the fitting portions 132a, 132b having bent configurations over prescribed lengths, respectively. The cam member 130 has a flange 134 on its upper end and also has grooves 136a through 136h defined in a side surface thereof at spaced intervals which are equal to the intervals at which the holes 118a through 118h are spaced. The grooves 136a through 136h have lower portions defined by surfaces 138a through 138h inclined downwardly toward the holder 111a. A roller 139 is rotatably supported on the lower end of the cam member 130, with a coil spring 140 being disposed on the cam member 130 between the holder 111a and the roller 139. The cam member 130 is normally biased by the coil spring 140 to be pulled downwardly for thereby holding the grooves 136a through 136h in registry with the holes 118a through 118h, respectively.

Attachment plates 142a, 142b (FIG. 6) are fixed at ends thereof to the upper portion 84a of the movable body 84 in diametrically opposite relation to each other or in symmetric relation with respect to the shaft 103a. The attachment plates 142a, 142b have bent opposite ends to which fixed cam members 144a, 144b are attached. The fixed cam members 144a, 144b have upper inclined cam surfaces 146a, 146b. The roller 139 on the cam member 130 engages the cam surface 146a of the fixed cam member 144a when the holder 111a faces the lower positioning plate 78 upon rotation of the shaft 103a. When the holder 111a faces the valve guide installing device 68, the roller 139 engages the cam surface 146b of the fixed cam member 144b.

The other holder 111b is of the same structure as that of the holder 111a, and will not be described in detail.

As shown in FIG. 1, another parts supplying device 12a is disposed adjacent to the parts supplying device 12. The parts supplying device 12a serves to supply valve guides arrayed and fed by the arraying mechanisms 32a, 32b to another valve guide installing device (not shown). The parts supplying device 12a has a lower positioning plate and holders which are designed for use with the non-illustrated valve guide installing device.

Operation and advantages of the automatic parts distributing and supplying system thus constructed will be described below.

The automatic parts distributing and supplying system 10 can be used for pressing valve guides into two types of cylinder heads. A process of supplying valve guides 26a, 26b to the parts installing device 68 which will press the valve guides 26a, 26b into a cylinder head for a four-cylinder, four-valve engine (not shown) will be described.

The valve guides 26a, 26b are delivered from the parts distributing device 16 to the parts supplying device 12 as follows:

The parts feeders 22a, 22b are supplied in advance with a number of valve guides 26a, 26b. When the parts feeders 22a, 22b are operated, valve guides 26a, 26b are successively fed via the tubular members 28a, 28b into the arraying mechanisms 30a, 30b. As shown in FIGS. 2 and 3, valve guides 26a delivered from the tubular member 28a into the arraying mechanism 30a enter the groove 48 of the distributor 46 as they drop along the inclined upper surface of the mount base 34a until the leading valve guide 26a is engaged by the engaging member 52. The valve guides 26a from the tubular member 28a are thus aligned in the groove 48. Now, a total of eight valve guides 26a are accommodated in the groove 48, and the ninth valve guide 26a has its front end positioned in alignment with the end surface 53 of the stopper 50 of the distributor 46.

Then, the cylinder 42 is actuated to move the piston rod 44 in the direction of the arrow A (FIG. 3). The distributor 46 coupled to the piston rod 44 is guided by the guide bars 54a, 54b for displacing the eight valve guides 26a in the distributor 46 laterally in the direction of the arrow A. First, the uppermost eighth valve guide 26a reaches the opening 60a of the distributing plate 56, whereupon the valve guide 26a falls through the opening 60a into the slot 38a of the plate 36. Since the plate 36 is inclined, the valve guide 26 slides by gravity down the slot 38a into the tubular member 40a communicating with the slot 38a. As the distributor 46 is further displaced in the direction of the arrow A, the next seventh valve guide 26a falls through the opening 60b into the slot 38b and slides down the slots 38b into the tubular member 40b.

Thus, the displacement of the distributor 46 in the direction of the arrow A causes the valve guides 26a in the groove 48 to fall successively through the openings 60a through 67h into the respective slots 38a through 38h, from which the valve guides 26a fall through the tubular members 40a through 40h and the support 62 into the corresponding holes 76a through 76h in the upper positioning plate 74.

The cylinder 42 is actuated in the reverse direction to move back the distributor 46 to the position of FIG. 3. Another succession of eight valve guides 26a which have been stopped by the end surface 53 of the stopper 50 are now introduced into the groove 48.

Similarly, valve guides 26b fed from the parts feeder 22b through the tubular member 28b into the arraying mechanism 30b are delivered through the tubular members 40k through 40r into the holes 76k through 76r in the upper positioning plate 74.

Figure 7A:
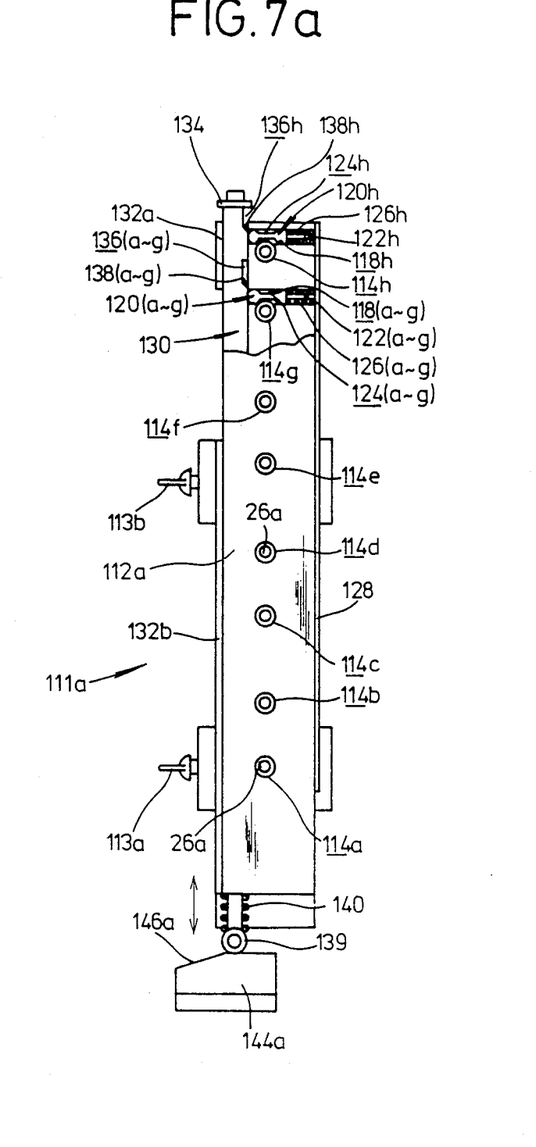
FIGS. 7(a) and 7(b) are plan views, partly cut away, of a holder member of the parts feed mechanism illustrated in FIG. 6.
Figure 7B:
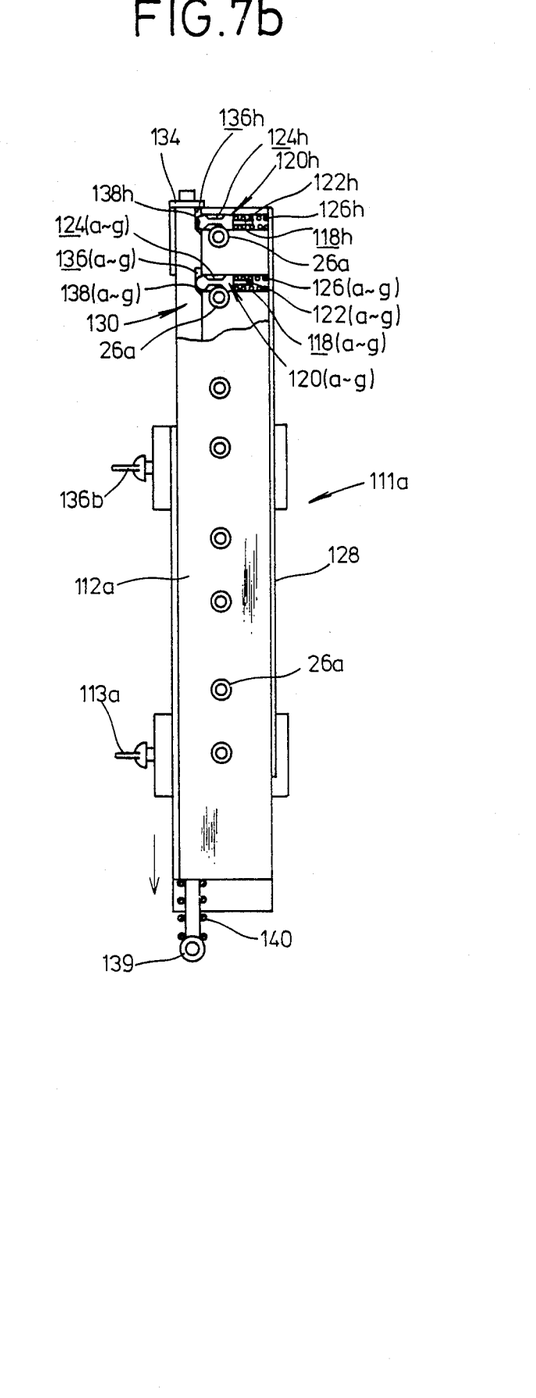

The valve guides 26a that have entered the holes 76a through 76h in the upper positioning plate 74 are then fed via the tubular members 82a through 82h into the holes 80a through 80h in the lower positioning plate 78. The holes 80a through 80h in the lower positioning plate 78 are spaced at intervals corresponding to the spaced intervals between the presser attachments 68a through 68h of the parts installing device 68, as described above. The eight valve guides 26a with their spacings adjusted by the holes 80a through 80h are allowed to drop into the respective holes 114a through 114h in the holder 111a which is positioned in confronting relation to the lower positioning plate 78. As shown in FIGS. 6 and 7(a), since the roller 138 on the cam member 130 engages the cam surface 146a of the fixed cam member 144a, at this time, the cam member 130 is displaced upwardly against the resiliency of the coil spring 140 to keep its flat surface in contact with the lock pins 120a through 120h. Therefore, the lock pins 120a through 120h remain positioned within the holes 118a through 118h against the bias of the coil springs 126a through 126h, and the circumferential grooves 124a through 124h of the lock pins 120a through 120h register with the holes 114a through 114h. As a result, the valve guides 26a can enter the holes 114a through 114h without being blocked by the lock pins 120a through 120h.

The valve guides 26b dropped into the holes 80i through 80p of the lower positioning plate 78 are similarly loaded into the holder 111b.

After the valve guides 26a, 26b have been supplied to the holders 111a, 111b, the cylinder 100 is actuated to move the rack 102 in the direction of the arrow B (FIG. 5) to cause the pinion 104 to rotate the shaft 103b in the direction of the arrow. The shaft 103a is also rotated in the direction of the arrow by the shaft 103b through meshing engagement of the gears 106a, 106b. Consequently, the arms 108a, 108b are rotated in the opposite directions. The holder 111a fixed to the attachment 112a of the arm 108a is angularly moved into a position confronting the parts installing device 68. At this time, the roller 139 on the cam member 130 is displaced along the cam surface 146a and off the fixed cam member 144a. As a result, the cam member 130 is lowered under the force of the coil spring 140 and positioned by the flange 134 engaging the holder 111a. As shown FIG. 7(b), the grooves 136a through 136h of the cam member 130 are brought into registry with the holes 118a through 118h, whereupon the lock pins 120a through 120h in the holes 118a through 118h are forced by the coil springs 126a through 126h to move their tip ends into the respective grooves 136a through 136h. The circumferential grooves 124a through 124h of the lock pins 120a through 120h now have their edges engaging the valve guides 26a, which are then fixedly positioned by the lock pins 120a through 120h.

Further displacement by the cylinder 100 of the rack 102 in the direction of the arrow B causes the shaft 103a to rotate until the roller 139 on the cam member 130 rides onto the cam surface 146b of the fixed cam member 144b. Therefore, the cam member 130 is lifted against the force of the coil spring 140 to enable the inclined faces 138a through 138h of the grooves 136a through 136h to push the lock pins 120a through 120h into the holes 118a through 118h. As a consequence, the valve guides 26a are loosely fitted in the circumferential grooves 124a through 124h of the lock pins 120a through 120h, and are unlocked.

As described above, the rotation of the shaft 103b in response to operation of the cylinder 100 causes the arm 108b on the shaft 103b to bring the holder 110b into a position in which it confronts the parts installing device 68.

Then, as shown in FIG. 5, the second cylinder 92 is actuated to extend the piston rod 92a in the direction of the arrow C for moving the movable body 84 in the same direction with respect to the movable base 88 while the movable body 84 is being guided on the guide bars 94a, 94b. The holders 111a, 111b are also moved with the movable body 84, so that the valve guides 26a accommodated in the holder 111a are transferred to the presser attachments 68a through 68h of the parts installing device 68.

The second cylinder 92 is then actuated back to move the piston rod 92a in the opposite direction to the direction C to move the movable body 84 away from the parts installing device 68, after which the first cylinder 86 is operated. The piston rod 86a is displaced in the direction of the arrow D and so is the movable base 88 with the movable body 84. The parts installing device 68 is turned to bring the presser attachments 68i through 68p thereof into confronting relation to the holder 111b. The second cylinder 92 is operated to transfer the valve guides 26b from the holder 111b to the presser attachments 68i through 68p. Thereafter, the movable body 84 is moved away from the parts installing device 68.

After the valve guides 26a, 26b have been discharged from the holders 111a, 111b to the parts installing device 68, the cylinder 111 is driven to displace the rack 102 in the direction opposite to the direction of the arrow B, whereupon the pinion 104 meshing with the rack 102 rotates in the reverse direction to rotate the shafts 103b, 103a in the directions opposite to the directions of the arrows. Thus, the holders 111a, 111b connected to the shafts 103a, 103b through the arms 108a, 108b are angularly moved back to the position in which the holders 111a, 111b face the lower positioning plate 78 in preparation for receiving another set of valve guides 26a, 26b fed through the arraying mechanisms 30a, 30b.

After having received the valve guides 26a, 26b, the parts installing device 68 is operated to press them into a cylinder head, not shown.

While the process of delivering valve guides 26a, 26b that have been fed via the arraying mechanisms 30a, 30b of the parts distributing device 16 to the parts installing device 26 through the parts supplying device 12 has been described above, it will be understood that valve guides can be delivered through the other arraying mechanisms 32a, 32b and the parts supplying device 12a to a parts installing device (now shown) in the same manner as described above.

With the illustrated embodiment, the valve guides 26a from the parts feeder 22a can reliably be transferred to the presser attachments 68a through 68h of the parts installing device 68 within a short period of time. The automatic parts distributing and supplying system of the present invention lends itself to various different parts installing devices.

More specifically, valve guides 26a supplied from the parts feeder 26a to the distributor 46 of the arraying mechanism 30a are fed along the inclined surface of the arraying mechanism 30a into the groove 48 of the distributor 46, so that a prescribed number of aligned valve guides 26a can be accommodated in the groove 48. When the distributor 46 is displaced in the direction of the arrow A by the cylinder 42, the valve guides 26a in the groove 48 are successively dropped, from the uppermost valve guide at first, into the openings 60a through 60h of the distributing plate 56 and then into the slots 38a through 38h - of the plate 36. Since the aligned valve guides 26a on the inclined distributing plate 56 are successively fed into the slots 38a through 38h through the distributing plate 56 while horizontally delivering the valve guides 26a on the distributing plate 56, the valve guides 26a can reliably be dropped into the respective slots 38a through 38h.

The spacings between the openings 60a through 60h of the distributing plate 56 are selected to be equal to the spaced intervals between the slots 38a through 38h of the plate 36. The spaced intervals between the adjacent valve guides 26a, 26b can easily be adjusted by positioning the opening 60b in alignment with the slot 38c or 38d, for example.

A desired number of valve guides 26a as they are equally spaced are fed from the parts distributing device 16 to the upper positioning plate 74 of the parts supplying device 12, as described above. Thus, with the holes 76a through 76j of the upper positioning plate 74 being spaced at the same intervals as those of the tubular members 40a through 40j fixed to the support 62, the valve guides 26a can reliably be delivered from the parts distributing device 16 to the parts supplying device 12. The holes 80a through 80h of the lower positioning plate 78 connected to the upper positioning plate 74 through the flexible tubular members 82a through 82h, and the holes 114a through 114h of the holder 111a are spaced at intervals corresponding to the spacings between the presser attachments 68a through 68h of the parts installing device 68. Therefore, the valve guides 26a fed from the upper positioning plate 74 via the lower positioning plate 78 into the holder 111a can accurately and smoothly be transferred to the presser attachments 68a through 68h of the parts installing device 68.

Since the valve guides 26a drop by gravity from the parts feeder 22a to the holder 111a, they can reliably be supplied to the parts installing device 68 without a jam or other trouble on the way in which they are fed.

After the valve guides 26a have been held by the holder 111a, the arm 108a is turned by the cylinder 100 to bring the holder 111a into confronting relation to the parts installing device 68. The valve guides 26a which have been supplied by gravity from the lower positioning plate 78 are positioned and held in the holes 114a through 114h of the holder 111a, and then the holder 111a is swung to confront the parts installing device 68. Accordingly, any elongate parts feeding passage which has conventionally been required is not needed, and the path of delivery for the valve guides 26a can be minimized. The automatic parts distributing and supplying system 10 can deliver cylindrical parts such as valve guides highly efficiently from the parts feeder 22a to the parts installing device 68.

When the holder 111a is angularly moved by the cylinder 100, the valve guides 26a are securely locked in the holes 114a through 114h of the holder 111a through the cam member 130 and the lock pins 120a through 120h. During swinging movement of the holder 111a, therefore, the valve guides 26a are prevented from dropping out of the holes 114a through 114h, and hence can reliably be transferred to the presser attachments 68a through 68h of the parts installing device 68. In addition, when the holder 111a receives the valve guides 26a from the lower positioning plate 78 while the holder 111a is confronting the lower positioning plate 78, and when the holder 111a discharges the valve guides 26a to the parts installing device 68 while the holder 111a is confronting the parts installing device 68, the cam member 130 is engaged by the cam members 144a, 144b to cause the lock pins 120a through 120h to release the valve guides 26a. Therefore, the valve guides 26a can easily be received from the lower positioning plate 78 and transferred to the parts installing device 68.

The parts supplying devices 12, 12a makes the automatic parts distributing and supplying system 10 adaptable for supplying valve guides to cylinder heads of two different kinds. Where valve guides are to be installed on cylinder heads of many types, the lower positioning plate 78 and the holders 111a, 111b of the parts supplying device 12 may be replaced with those suitable for a desired cylinder head. More specifically, in the parts distributing device 16, the distributing plate 56 of the arraying mechanism 30a may be replaced with a distributing plate having a desired number of openings suitable for the desired cylinder head, and the position of the engaging member 52 of the distributor 46 may be varied to meet the desired cylinder head, so that a number of valve guides 26a corresponding to the desired cylinder head may be fed to the parts supplying device 12. Therefore, a desired number of valve guides 26a can be fed to the upper positioning plate 74 of the parts supplying device 12. The lower positioning plate 78 may also be replaced with a lower positioning plate having hole spacings adjusted to match the spaced intervals of valve guides 26a on the desired cylinder head, with the result that the valve guides 26a can be fed from the upper positioning plate 74 through the tubular members 82a through 82n to the new lower positioning plate 78, so that the spaced intervals of the valve guides 26a can be adjusted to meet the desired cylinder head. Moreover, the holder 111a may be replaced with a holder having a number of holes suitable for the desired cylinder head, so that the valve guides 26a can be delivered from the lower positioning plate 78 to the new holder 111a. As a result, the valve guides 26a can be transferred from the new holder 111a to the presser attachments 68a through 68h of the parts installing device 68.

The other valve guides 26b can be supplied by another parts installing device 68 simply by replacing the lower positioning plate 78 and the holder 111b with other ones.

According to the present invention, as described above, a first positioning plate for accommodating parts delivered at equally spaced intervals from a parts distributing device and a second positioning plate for spacing the parts at prescribed intervals in order to install the parts on a desired workpiece are connected to each other by flexible tubular members, and a holder for confronting the second positioning plate and a parts installing device has parts storage areas corresponding to the spaced intervals of the parts on the second positioning plate. After a prescribed number of parts that have been fed from the parts distributing device at equally spaced intervals are received by the first positioning plate, the parts are spaced by the second positioning plate at desired intervals corresponding to positions where the parts are to be installed on the workpiece, and then the parts are positioned by the holder and transferred to the parts installing device. Accordingly, the parts can be supplied highly reliably. Parts can be installed on different types of workpieces simply by replacing the second positioning plate and the holder with those suitable for such different workpiece types. Therefore, the cost of manufacture is lower and the automatic parts distributing and supplying system can take up a smaller space in a working area than a conventional arrangement in which as many parts supplying devices as the number of different types of workpieces should be provided.

Parts can be supplied from a parts feeder to the holder simply by gravity, and hence can reliably be fed to the holder even if they are of a rod shape or any other shape. After the parts have been positioned by the holder, the holder is angularly displaced so as to confront the parts installing device. As a consequence, a considerably long delivery passage which has heretofore been necessary is not required, and the parts can be fed from the parts feeder to the parts installing device in a reduced period of time. The automatic parts distributing and supplying system is also a spacer saver. The parts can therefore be supplied reliably and quickly to the parts installing device, with the result that the parts can be installed with high efficiency.

By replacing the holder with holders for storing parts at areas corresponding to different parts installing positions, the automatic parts distributing and supplying system can be adapted to various different types of workpieces and hence is highly versatile.

When the holder is angularly moved toward the parts installing device, the parts are securely locked in the holder against dislodgment from the holder. Thus, the parts can reliably be transferred from the holder to the parts installing device.

Further according to the present invention, after parts fed from the parts feeder have been aligned on the inclined distributing plate, the parts are moved horizontally over the distributing plate and dropped successively into delivery passageways or slots through spaced openings defined in the distributing plate at the same heights as those of the parts in the distributor. Consequently, a plurality of parts can reliably be fed one by one, from the uppermost part at first, into the desired respective delivery passageways. The parts can thus be fed efficiently to the parts supplying device. The spacings between parts to be distributed can easily be varied by selecting the spaced intervals between the openings of the distributing plate, so that various different parts can be distributed by the parts distributing device.

Although a certain preferred embodiment has been shown and described, it should be understood that many changes and modifications may be made therein without departing from the scope of the appended claims.

What is claimed is:

1. A system for automatically distributing and supplying parts, comprising:
   a parts distribution device for delivering an array of parts; and
   a parts supplying device for feeding the parts to a parts installing device at spaced intervals corresponding to parts installing positions;
   said parts supplying device including at least a positioning member for receiving the delivered array of parts and for spacing the parts at spaced intervals, and a parts feed mechanism movable selectively into confronting relation to said positioning member and said parts installing device, said parts feed mechanism for receiving the parts from said positioning member and feeding the parts to said parts installing device;
   said parts supplying device further comprising:
   a base displaceable with respect to a foundation base; and
   a movable body mounted on said base and movable toward and away from said parts installing device by an actuator;
   said parts feed mechanism having an angularly movable arm mounted on said movable body, a holder being mounted on said arm, said movable body being displaceable by said actuator toward said parts installing device for allowing said holder to supply the parts to said parts installing device after the parts are delivered from said parts distributing device to said positioning member, said parts are positioned and held in said holder and said holder is brought into confronting relation to said parts installing device in said parts discharging position.

2. A system according to claim 1, wherein said positioning member comprises a first positioning member for receiving the delivered array of parts and a second positioning member for spacing the parts at spaced intervals, said second positioning member being connected to said first positioning member through flexible tubular members.

3. A system according to claim 1, wherein said holder positions and holds the parts at said spaced intervals corresponding to the parts installing positions, said holder being displaceable from a parts receiving position in which said holder receives the parts from said parts distributing device and holds the parts therein, to a parts discharging position in which said holder discharges the parts to said parts installing device.

4. A system according to claim 3, wherein said holder includes first and second holders, said parts feed mechanism comprising first and second rotatable shafts supporting respective gears fixed thereto and meshing with each other, rotating means coupled to one of said first and second rotatable shafts for rotating the first and second rotatable shafts through said gears, and first and second arms supporting said first and second holders thereon and mounted on said first and second rotatable shafts, respectively, the arrangement being such that after the parts have been held in said first and second holders, said first and second arms are turned by said rotating means from said parts receiving position to said parts discharging position to bring said first and second holders into confronting relation to said parts installing device.

5. A system according to claim 1, wherein said holder includes first and second holders, said parts feed mechanism comprising first and second rotatable shafts supporting respective gears fixed thereto and meshing with each other, rotating means coupled to one of said first and second rotatable shafts for rotating the first and second rotatable shafts through said gears, and first and second arms supporting said first and second holders thereon and mounted on said first and second rotatable shafts, respectively, the arrangement being such that after the parts have been held in said first and second holders, said first and second arms are turned by said rotating means from said gears receiving position to said parts discharging position to bring said first and second holders into confronting relation to said parts installing device.

6. A system according to claim 5, wherein said rotating means comprises a rack-and-pinion mechanism including an actuator, said actuator comprising a cylinder having a piston rod, said rack-and-pinion mechanism having a rack connected to said piston rod and a pinion mounted on one of said first and second rotatable shafts and held in mesh with said rack, whereby when said cylinder is actuated, said first and second rotatable shafts can be rotated in unison through said rack and said pinion.

7. A system according to claim 5, wherein said rotating means comprises a rack-and-pinion mechanism including an actuator, said actuator comprising a cylinder having a piston rod, said rack-and-pinion mechanism having a rack connected to said piston rod and a pinion mounted on one of said first and second rotatable shafts and held in mesh with said rack, whereby when said cylinder is actuated, said first and second rotatable shafts can be rotated in unison through said rack and said pinion.

8. A system according to claim 1, wherein said holder and said second positioning member are spaced from each other by a gap smaller than the length of said parts in the direction in which they are delivered.

9. A system according to claim 1, wherein said second positioning member is detachably mounted on said base.

10. A system according to claim 1, wherein said holder is detachably mounted on said arm.

11. A system according to claim 1, wherein said parts are valve guides.

12. A system for automatically distributing and supplying parts, comprising:
a parts distribution device for delivering an array of parts; and
a parts supplying device for feeding the parts to a parts installing device at spaced intervals corresponding to parts installing positions;
said parts supplying device comprising:
  a first positioning member for receiving the delivered array of parts;
  a second positioning member connected to said first positioning member through flexible tubular members for spacing the parts at said spaced intervals, and
  a parts feed mechanism movable selectively into confronting relation to said second positioning member and said parts installing device for receiving the parts from said second positioning member and feeding the parts to said parts installing device;
  said parts feed mechanism comprising: first and second rotatable shafts supporting respective gears fixed thereto and meshing with each other;
  rotating means coupled to one of said first and second rotatable shafts for rotating the first and second rotatable shafts through said gears;
  first and second holders for positioning and holding parts therein;
  the first and second arms supporting said first and second holders thereon and mounted on said first and second rotatable shafts, respectively;
  wherein after the parts have been held in said first and second holders, said first and second arms are turned by said rotating means to bring said first and second holders into confronting relation to said parts installing device.

13. A system according to claim 12, wherein said rotating means comprises a rack-and-pinion mechanism including an actuator, said actuator comprising a cylinder having a piston rod, said rack-and-pinion mechanism having a rack connected to said piston rod and a pinion mounted on one of said first and second rotatable shafts and held in mesh with said rack, whereby when said cylinder is actuated, said first and second rotatable shafts can be rotated in unison through said rack and said pinion.

14. A system for automatically distributing and supplying parts, comprising:
a parts distributing device for delivering an array of parts; and
a parts supplying device for feeding the parts to a parts installing device at spaced intervals corresponding to parts installing positions;
said parts supplying device comprising:
  a first positioning member for receiving the delivered array of parts;
  a second positioning member connected to said first positioning member through flexible tubular members for spacing the parts at said spaced intervals, and
  a parts feed mechanism movable selectively into confronting relation to said second positioning member and said parts installing device for receiving the parts from said second positioning member and feeding the parts to said parts installing device;
  said parts feed mechanism includes a holder for positioning and holding the parts at said spaced intervals corresponding to the parts installing positions, said holder being displaceable from a parts receiving position in which said holder receives the parts from said parts distributing device and holds the parts therein to a parts discharging position in which said holder discharges the parts to said parts installing device;

said parts feed mechanism includes lock means for securely holding the parts in said holder, said lock means being released to receive and discharge the parts when said holder reaches each of said parts receiving position and said parts discharging position, and being actuated to lock the parts in said holder while the holder is being moved between said parts receiving position and said parts discharging position;

said holder comprising:

a plurality of first holes defined therein for receiving the parts therein;

a plurality of second holes defined therein substantially perpendicular to said first holes;

a plurality of lock pins disposed in said second holes, respectively, and associated with resilient members, respectively;

a fixed cam member; and a locking cam member slidably mounted on said holder and extending perpendicularly to said lock pins;

said cam member having cam faces for engaging said lock pins and grooves for receiving said lock pins;

wherein said holder reaches each of said parts receiving position and said parts discharging position, said locking cam member is engaged by said fixed cam member to cause said cam faces to push said lock pins into said second holes to release the parts, and when said holder is displaced between said parts receiving position and said parts discharging position, said lock pins are moved by said resilient members into said grooves of said cam member to lock the parts in said holder.

15. A system according to claim 14, wherein each of said lock pins has a circumferential groove defined in an outer circumferential surface thereof, the arrangement being such that when said lock pins are pushed by said cam faces of said locking cam member, the parts are loosely fitted in said circumferential grooves of the lock pins to allow the parts to be released from said holder, and when said lock pins are positioned in said grooves of the locking cam member, surfaces defining said circumferential grooves of said lock pins push said parts under the resiliency of said resilient members to lockingly hold said parts in said holder.

16. A system according to claim 14, wherein said first holes of said holder have a depth selected to cause the parts received therein to be partly exposed out of said holder.

17. A system according to claim 14, wherein said parts feed mechanism further includes a rotatable member mounted on said locking cam member, said rotatable member being rotatable on said fixed cam member.

18. A system for automatically distributing and supplying parts, comprising:

a parts distribution device for delivering an array of parts; and a parts supplying device for feeding the parts to a parts installing device at spaced intervals corresponding to parts installing positions;

said parts supplying device comprising:

a first positioning member for receiving the delivered array of parts;

a second positioning member connected to said first positioning member through flexible tubular members for spacing the parts at said spaced intervals, and a parts feed mechanism movable selectively into confronting relation to said second positioning member and said parts installing device for receiving the parts from said second positioning member and feeding the parts to said parts installing device;

said parts distributing device comprising:

a main body inclined in a first direction with respect to a vertical direction and having a plurality of parts delivery passages;

a distributing plate mounted on an upper surface of said main body and a plurality of parts insertion openings defined therein in alignment with said parts delivery passages, respectively, and disposed at respective heights dependent on the parts; and a distributor for aligning parts on said distributing plate at one end thereof in said first direction;

said distributor being movable by an actuator to move the parts in a second direction normal to said first direction;

wherein after the parts delivered from a parts feeder have been aligned by said distributor, said distributor is moved by said actuator in said second direction to allow said parts to drop through said parts insertion openings into said parts delivery passages, respectively.

19. A system according to claim 18, wherein said distributor has a parts fitting groove for aligning the parts therein on said distributing plate, and includes a stopper, the arrangement being such that when said distributor is moved by said actuator, a set of parts to be distributed in a next cycle which are held against the uppermost one of the parts in said parts fitting groove are retained by said stopper against movement into said distributor.

20. A system according to claim 18, wherein said distributor has a parts fitting groove for aligning the parts therein on said distributing plate, and supports an engaging member positionally adjustably mounted on said distributor and entering said parts fitting groove to keep the parts in said parts fitting groove.

21. A system according to claim 18, wherein said distributing plate is detachably mounted on said main body.

22. A system according to claim 18, wherein said main body has an upper portion connected to said parts feeder positioned above said main body through a flexible tubular member, further including a plurality of flexible tubular members connected to said parts delivery passages, respectively, of said main body and directed downwardly in registry with parts insertion holes defined in said first positioning member of said parts supplying device.

* * * * *